US011172034B2

(12) United States Patent
Schacht

(10) Patent No.: US 11,172,034 B2
(45) Date of Patent: Nov. 9, 2021

(54) SYSTEM AND METHOD FOR LOCATION AWARE CONTENT MANAGEMENT SYSTEM

(71) Applicant: OPEN TEXT SA ULC, Halifax (CA)

(72) Inventor: Johannes Schacht, Constance (DE)

(73) Assignee: OPEN TEXT SA ULC, Halifax (CA)

( * ) Notice: Subject to any disclaimer, the term of this patent is extended or adjusted under 35 U.S.C. 154(b) by 19 days.

(21) Appl. No.: 15/942,197

(22) Filed: Mar. 30, 2018

(65) Prior Publication Data
US 2018/0288173 A1  Oct. 4, 2018

Related U.S. Application Data

(60) Provisional application No. 62/479,955, filed on Mar. 31, 2017.

(51) Int. Cl.
| | |
|---|---|
| *G06F 15/16* | (2006.01) |
| *H04L 29/08* | (2006.01) |
| *H04L 29/06* | (2006.01) |
| *G06F 16/958* | (2019.01) |
| *G06F 16/9537* | (2019.01) |

(52) U.S. Cl.
CPC ............ *H04L 67/18* (2013.01); *G06F 16/958* (2019.01); *G06F 16/9537* (2019.01); *H04L 63/0876* (2013.01); *H04L 67/02* (2013.01); *H04L 67/06* (2013.01); *H04L 67/1097* (2013.01); *H04L 67/32* (2013.01); *H04L 69/329* (2013.01)

(58) Field of Classification Search
CPC ......... H04L 67/18; H04L 67/02; H04L 67/06; H04L 67/1097; H04L 67/32; H04L 39/329; G06F 16/958; G06F 16/9537
USPC .................................................. 709/203, 201
See application file for complete search history.

(56) References Cited

U.S. PATENT DOCUMENTS

| | | | |
|---|---|---|---|
| 2012/0131094 A1* | 5/2012 | Lyons ................ | G06Q 30/0255 709/203 |
| 2015/0088982 A1* | 3/2015 | Johnson .............. | H04L 67/1004 709/203 |
| 2017/0060777 A1* | 3/2017 | Sivaramamurthy .. | H04L 9/0877 |
| 2017/0193122 A1* | 7/2017 | Wright ................. | G06F 16/954 |

* cited by examiner

*Primary Examiner* — George C Neurauter, Jr.
*Assistant Examiner* — Joel Mesa
(74) *Attorney, Agent, or Firm* — Sprinkle IP Law Group

(57) ABSTRACT

A content management system that is configured to receive, over a network, a request from a first application associated with a user to access a container in a content navigation structure, mark a location in the content navigation structure for the user based on activity by the user in the first application, associate a second application with the user and provide the marked location over the network to the second application to enable the second application to access the marked location.

23 Claims, 12 Drawing Sheets

SYSTEM AND METHOD FOR LOCATION AWARE CONTENT MANAGEMENT SYSTEM

RELATED APPLICATIONS

This application claims the benefit of priority under 35 U.S.C. § 119(e) to U.S. Provisional Patent Application No. 62/479,955, entitled "System and Method for Location Aware Content Management," filed Mar. 31, 2017, which is hereby fully incorporated by reference herein for all purposes.

TECHNICAL FIELD

This disclosure relates generally to the field of content management. More specifically, the disclosure relates to systems and methods to provide location aware content management.

BACKGROUND

With the ever increasing prevalence and proliferation of electronic content has come a commensurate need for the management of such content. Content management systems do just that, allowing for the management of such content by controlling the access, editing, updating, versioning, etc. of content. In certain contexts, such as in an enterprise setting, there may be millions or even billions pieces of content that need to be managed, and users may desire to have access to these documents from a variety of distributed access points. To facilitate content management in conjunction with such distributed access, content management systems may be organized around one or more content management servers that provide services associated with the management of such content. Content management servers like these may be deployed in the cloud or otherwise distributed.

Using such content management systems then, users may access managed content to, for example, edit such content. To access such content users typically use a user interface (UI) to interface with a content management server of the content management system. Through the UI, a user can download content locally on their computer (e.g., referred to as a client), upload content to the content management system and otherwise interact with the content management system. To facilitate finding and organizing content, content management systems typically provide some form of content navigation structure in which content items are arranged in containers, such as folders.

A content management system may be accessible by the same user using multiple devices.

For example, a user may access a content management system using one computer at the office, another computer at home and smart phone when on the go. Typically, the application on each user computer used to access the content management system navigates the content navigation structure without regard to the applications the other user device (s). In fact, even multiple applications on the same device—say two web browsers or two different mobile apps that can be used to access the content management system—typically navigate the content management navigation structure without consideration of each other. This means that if the same user wishes to simultaneously access the same container to perform operations using applications on two devices or even two applications on the same device, the user must independently navigate through the content navigation structure to the desired container using each application. Independent navigation of the content management structure to the same container is not only inconvenient for the user, but is also inefficient because it requires corresponding network calls from each application to navigate through the structure, bandwidth to transfer data related to such independent navigation and duplicative processing by the server to process navigation by each application.

SUMMARY

Embodiments as disclosed may provide location marking and location access that addresses the problems inherent with requiring independent navigation by multiple applications. One embodiment comprises a system having a processor and a memory. The memory has stored thereon instructions executable by the processor to receive, over a network, a request from a first application associated with a user to access a container in a content navigation structure, mark a location in the content navigation structure for the user based on activity by the user in the first application, associate a second application with the user and provide the marked location over the network to the second application to enable the second application to access the marked location. The second application may thus directly access the marked location without navigating through the content navigation structure to the marked location. The first and second application may reside on the same client device or different client devices.

Another embodiment comprises a server, a first client device and a second client device.

The first client device comprises a first client application and the second client device comprises a second client application. The server is configured to manage content and provide content navigation structure for the managed content, the content navigation structure comprising containers. The server is further configured to mark a location in the content navigation structure for the user based on activity in a first application by the user. The second application is configured to authenticate with the server using credentials associated with the user and automatically access the marked location. Thus, the second application can access a location in the content navigation structure based on activity in the first application.

Another embodiment can include a computer program product comprising a non-transitory computer readable medium storing instructions executable to receive, over a network, a request from a first application associated with a user to access a container in a content navigation structure, mark a location the content navigation structure for the user based on activity by the user in the first application, associate a second application with the user and provide the marked location over the network to the second application to enable the second application to access the marked location.

According to one embodiment, the marked location can be a current location accessed by the first application. The marked location may be designated by the first application. The marked location can be location that is different than a default location for the user in the content navigation structure.

Embodiments provide an advantage because a second application can directly access a location in a content navigation structure based on activity in a first application—that is the second application can access the location without the second application having to navigate through the content management structure to the location. This can reduce the number of calls required by the second application to access the location compared to the second application navigating through the navigation structure from an entry point to the location. Consequently, embodiments can reduce the amount of data transferred for a second application to access the location and the amount of processing required by a server to allow the second application to access the location. Furthermore, embodiments allow a user to more efficiently use a content management system.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In general, embodiments described herein provide a content management system that marks a location for a user based on activity by the user in a first application and uses the marked location to enable a second application to access the marked location without navigating through a content navigation structure from an entry point to the marked location. According to one embodiment, the content management system provides the marked location to a second application associated with the user so that the second application can efficiently access the marked location. The first application and second application may be on different computing devices and have different capabilities.

As an example, as a user works on his or her workstation using an application (e.g., a browser based editor or other application) to edit content in a container (e.g., a folder or other container) managed by a content management system, the user may wish to scan a document to that container. In accordance with one aspect of the present disclosure, the content management system can track the user's current location accessed via the workstation-based application or receive a designation of a location from the workstation-based application, mark the accessed/designated location and provide the marked location to a mobile scanning app on the user's smart phone to enable the mobile scanning app to access the marked location without navigating through the content navigation structure to the marked location. The mobile scanning app can thus scan the desired document to the marked location without the user having to manually navigate to the location via the scanning app.

Figure 1:
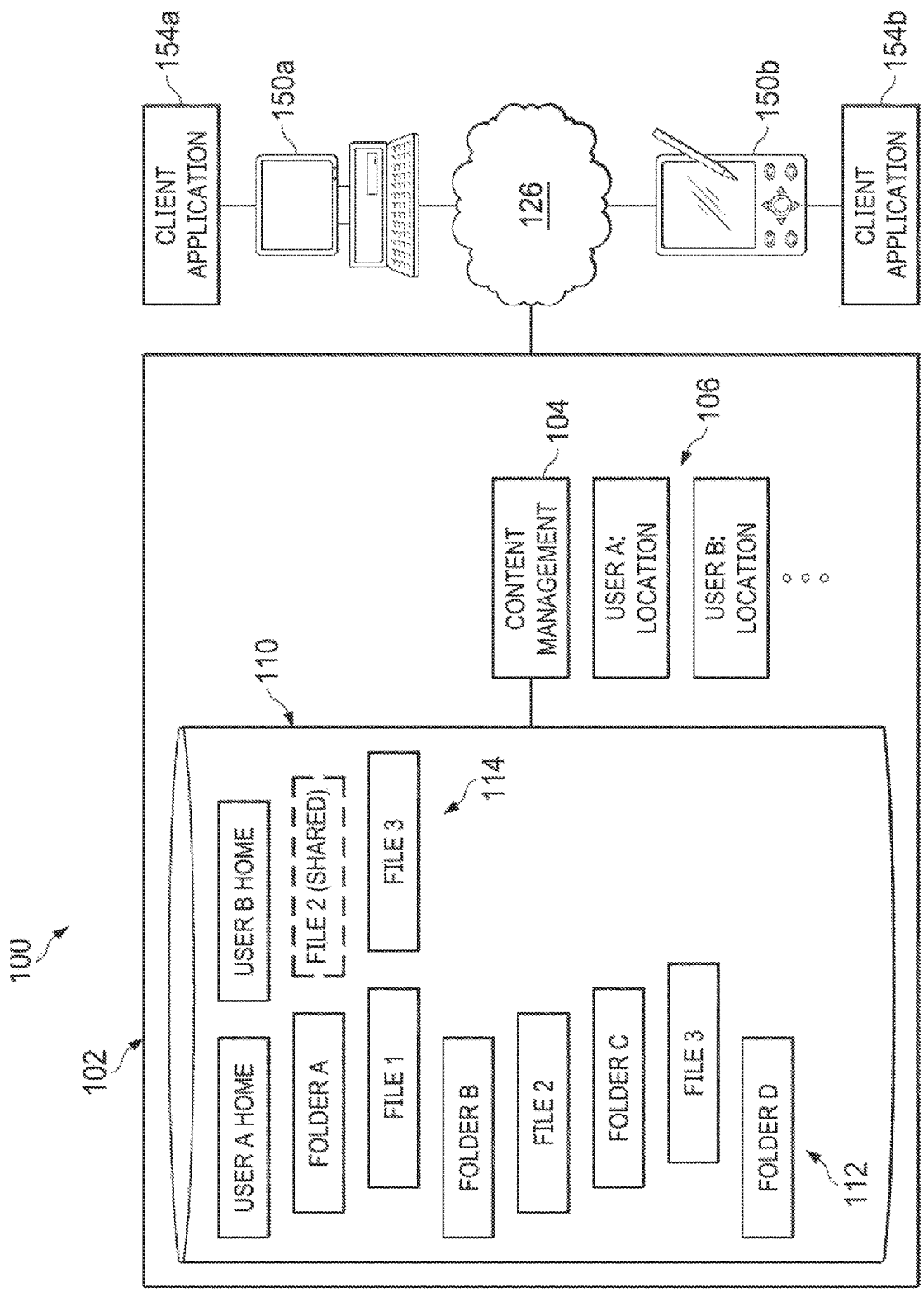
FIG. 1 is a block diagram depicting one embodiment of a content management environment in which location marking may be implemented.

FIG. 1 is a block diagram of one embodiment of a content management environment 100 for managing and accessing content. System 100 includes a content management server 102 coupled to client devices (e.g., client devices 150a, 150b) by a network 126. While only a single server 102, client device 150a and client device 150b is illustrated for convenience, content management environment 100 may include a number of servers 102, client devices 150a and client devices 150b.

Content management server 102 executes a content management application 104 to manage items stored in data store 110, which may include one or more file systems, databases or other data stores to store managed items. The managed items may include identifiable units of information such as electronic files, objects, programs, databases, images, emails, messages or other identifiable units of information. Content management application 104 can provide an Application Program Interface (API) or other interface to allow applications on client devices (e.g., client devices 150a, 150b) to access items from data store 110.

Content management server 102 provides a content navigation structure in which items are arranged in identifiable containers. A container can be any object to which another object or content can be added. In one embodiment, content management application 104 comprises a document management system in which the containers are folders. As another example, content management application 104 may be workflow or business process management software that connects documents to process instances. Workflows may handle so-called entity instances and documents can be attached to entity instances. In such a system, a workflow entity instance may serve as a container. As another example, content management application 104 may comprise financial software that handles transactions like the payment of invoices. As is known in the art, in some financial software, such as SAP for example, any business object, e.g. an invoice may be connected to a document. Thus, in some implementations, business objects, such as invoices and other objects may act as containers. A container may thus correspond to, for example, a workspace, a project, a folder, a business object, an entity instance, or other container tracked by an identifier that identifies the container in the particular environment. For the sake of discussion, embodiments of content management system 100 will be discussed primarily using the example of folders as containers, though it should be understood that embodiments may be implemented with respect to other containers. The content navigation structure, in some embodiments, may be visualized as a hierarchical tree structure where nodes specify distinct containers that may contain zero or more containers or other items.

Content management server 102 may manage items as a set of objects with each item being associated with content management metadata for that item. For example, content management server 102 may manage files and folders (or other data resources) as set of objects. Data store 110 may thus provide an object-based data store in which files and folders (or other data resources) are managed as set of objects. Managed folders at content management server 102 may be "virtual" folders that do not correspond to actual file directory paths in a file system of data store 110. The files managed by content management system 102 may be files stored in a file system of data store 110, files stored in a database (e.g., as blobs) or sets of logically related data managed as file objects.

In order to manage content in the content management system (e.g., as stored in data store 110) the content management application 104 may utilize one or more object identifiers, such as GUIDs, to uniquely identify objects (at least within the scope of data storage 110). In one embodiment, the content management module 104 may use a content management node identifier (node id) that can serve to identify a file or a container regardless of its location in data store 110 or version. Additionally, other metadata may be associated with each object such as the size of a file, a timestamp indicating a last save time, etc. In any event, each item (file, container or other item) is identifiable to content management application 104 by an identifier (a single identifier or combination of identifiers that identify the object). An object may reference other objects. For example, a file or folder may reference a file or folder in which it is contained or vice versa.

Accordingly, content management metadata may include or more pieces (or combination thereof) of metadata associated with a managed object. Content management metadata may contain enough information that the content management application 104 will be able to, for example, locate the managed object in data store 110 even in cases where the managed object has changed location on the file system or determine if an object is a latest or same version of that object, or perform other operations with respect to managed objects.

As discussed above, content management application 104 may provide a content navigation structure in which resources are arranged in identifiable containers. The content navigation structure may, for example, be visualized as a hierarchical tree structure in which nodes in the tree correspond to files and folders arranged based on parent-child relationships defined in the file and folder objects. FIG. 1, for example, depicts content management structure 112 of related files and folders accessible by "User A" and content management structure 114 of related files and folders accessible by "User B." The content navigation structures 112, 114 reflect relationships between file and folder objects and may or may not reflect an actual arrangement of files and folders in a file system of data store 110.

Content management application 104 provides user interface functionality for accessing items managed by content management system. The interface functionality may be provided through any suitable mechanism including, but not limited to, a web application server exposing a REST API or through another mechanism. Content management application 104 processes requests submitted via client applications running on client devices 150a, 150b to enable users to perform, via the client applications, various operations, such as uploading items, downloading items, reserving items, editing content, searching, adding items to containers, removing items from containers, adding containers, editing containers, removing containers and other operations. A user's ability to access particular items and perform particular operations may be limited based on permissions.

Each device 150a, 150b may include a variety of programs including, but not limited to, an operating system, web browsers, editing applications, such as document editors, spreadsheet programs, presentation editors, business applications or other applications. The client applications 154a, 154b can be any applications on the client devices 150a, 150b that are configured to provide content to or retrieve content from content management server 102. The client applications can be, for example, a web browser, an editing application, a business application, a mobile application (mobile app) or other application. Different client applications 154a, 154b may have different capabilities.

A user may attempt to access managed files in a variety of ways, including through a web-based interface, directly through an business or editing application, through a mobile app, etc., though access to content may be restricted based on user credentials (e.g., username and password) and sharing permissions. In some cases, the client application 154a, 154b stores the login and authentication information such that the client application 154a, 154b can connect to server 102 without requiring the user to re-enter his/her login and/or authentication information. The login and authentication information can include username and password, authentication tokens provided by an authentication authority to re-establish sessions or other credentials.

When a user logs in to content management application 104, the user may be presented with an interface corresponding to the user's entry point into content management application 104. The entry point for a user may be a container corresponding to highest level in a navigation hierarchy to which the user has access or some other default location in the hierarchy. The content navigation structure for a user may thus, in one embodiment, comprise the entry point and objects descending from the entry point to which the user has access. In the example of FIG. 1, for example, a "User A Home" container represents the entry point for a "User A" and the "User B Home" container represents an entry point for User B. While, in the embodiment illustrated, each user has his/her own entry point, in other embodiments the users may share an entry point. For example, an enterprise may establish a shared entry point for the enterprise or users in a particular group. The user interface corresponding to the entry point may include representations of descendent objects (e.g., files, folders) through one or more levels of a hierarchy.

From the entry point, a user can navigate to decedent containers (e.g., folders in some embodiments). As a user navigates the navigation structure, the client application 154 sends requests to content management application 104 to request data for the corresponding objects to display to the user. According to one embodiment, if a user clicks on a representation of a container in client application 154a, client application 154a can send a request to content management application 104 with the object id for the container. In response, content management application 104 sends responsive data so that client application 154a can display the contents of the container at client computer 150a (e.g., representations of files and sub-folders in the selected container).

For example, User A can be presented with an interface corresponding to "User A Home" that contains representations of Folder A, Folder B and Folder D. If the user clicks on the representation of Folder B in client application 154a, client application 154a can send the object id for Folder B to content management application 104. Content management application 104 can then return data so that client application 154a displays an interface corresponding to Folder B that contains representations of File 2 and Folder C.

In some cases, client application 154a may be configured to cache all or a portion of content navigation hierarchy. According to one embodiment, if client application 154a caches data from content management system 102, client application 154a can be configured to send an indication of an item selected for viewing even if client application 154a does not need additional data for that item. For example, if a user navigates from a first container (e.g., User A Home) to a second container (e.g., Folder B) and the data for the second container is already cached at client application 154a, client application 154a can send the object id of the second container to content management application 104 so that content management application 104 can track that the user is accessing the second container.

Content management application maintains a location marker 106 for each connected user that associates a location with that user and updates the location marker 106 for a user based on user activity in a tracked client application. A location marker 106 may include an object identifier for the current location accessed via an application (e.g., object id for the last qualified container accessed by the user through client application 154a) or designated via an application. In some embodiments, content management application 104 only marks a single location per user at a time. In other embodiments, the content management application 104 may mark multiple locations for a user.

According to one embodiment, referred to as an explicit location marking mode, the user may select, via a user interface presented in a client application (e.g., using context menus or the like), one or more qualified containers to mark. Content management application can store a designated location in a location marker 106 for that user. In some cases, the user may only be given the option to designate containers as marked containers in a particular application, but not other. For example, a user may be given the option to designate a folder as a marked location in an interface presented by first application 154a, but not in the interface provided by second application 154b. Moreover, in some embodiments, the user may only be given the option to designate certain containers as a marked location.

According to another embodiment, content management application 104 automatically tracks a current location though an implicit location marking mode that does not require the user to explicitly mark a location. In the implicit marking mode, content management application 104 tracks the objects accessed by users and applies location tracking rules to this information to track the current location for a user that corresponds to the last qualified container accessed by the user in application 154a.

In one embodiment, any container may be considered a qualified container for purposes of location marking. In other embodiments, a container may have to meet particular qualifications to qualify. For example, content management application 104 may be configured such that only certain types of containers can serve as a marked location. As another example, content management application 104 may be configured such that certain types of containers can serve as marked locations if accessed through one type of application, but not another (e.g., a document can be a current location if accessed through a document editing application, but not when accessed through a browser-based viewer).

Rules may be implemented for selecting which application is a tracked application for a user. The tracked application may be determined based, for example, on the application type. For example, according to one embodiment, content management application 104 may track the user's current location based on the user's activity via a web interface or dedicated business application executing on a workstation, but not track current location based on activity via a mobile application on a smart phone. In such an embodiment, the user's activity in the mobile application will not change location marker 106 for that user. As another example, for a set of client applications 154a, 154b associated with a user, content management application 104 may update the location marker 106 for that user based on activity in the first application to have logged in among multiple applications having overlapping sessions. If the session with the first application ends, another application associated with the user and having a remaining session may become the tracked application.

A location marker can be maintained until the occurrence of a predefined event. According to one embodiment, for example, a location marker is set until the user cancels or changes or the marked location. Thus, a user may log off the first application, but the location marker will remain available to the second application. In another embodiment, content management application 104 maintains the location marker until either the second application 154b completes a particular access request with respect to the location (reads a file from or writes a file to the marked location) or the user specifies through application 154a or 154b that the current location should be changed or cancelled. In addition or in the alternative, content management application 104 may maintain the location marker 106 for a user only while a session remains open with a tracked application. For example, if application 154a is the tracked application, content management application 104, according to one embodiment, will only maintain a location marker 106 for the user while a session with application 154a is open for that user. In another embodiment, a location marker 106 for a user can persist after a session with a tracked application has terminated.

In accordance with one embodiment, marking a location via a location marker 106 does not change the default location for the user. Thus, the entry point into the content navigation structure for a user accessing content via client application 154a may remain the same between sessions (assuming changes to the content navigation structure that would affect the default location are not made).

The API (or other interface) of content management application 104 can define a request and response for requesting and returning the marked location associated with a user. As such, a second application 154b can be configured to log on to content management application 104 using credentials associated with a user and request the location marker 106 for the user. Content management application 104 can return the marked location for that user, if available, to the second application 154*b*. The second application 154*b* may then select the marked location as the target for an access request (e.g., requests to upload data to, download data from the container). Thus, second application 154*b* accesses the marked location as result of navigation on the first device 150*a* without requiring the user to manually navigate through the content navigation structure to the marked location using second device 150*b*.

In another embodiment, the second application 154*b*, upon receiving the marked location(s) from content management application 104, notifies the user at client device 150*b* of the marked location(s) and allows the user to determine whether second application 154*b* should use one of the marked locations as the target for an access request. If the user selects a marked location, second application 154*b* can set the target location for an access request (e.g., upload request, content retrieval request) to the selected marked location. If the user does not select a marked location, second application 154*b* may use the default location for the user or another location selected by the user.

The content management server 102 may be embodied on one or more server machines operating in a network environment. A suitable server machine may comprise a data processing system having one or more central processing units (CPU) or processors coupled to one or more user input/output (I/O) devices and memory devices. Examples of representative I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs), smart cards. Such a data processing system may be coupled to a display, an information device, and various peripheral devices such as printers, plotters, speakers, etc. through appropriate I/O devices. Furthermore, such a data processing system may also be coupled to external computers or other devices through network interface(s), wireless transceiver (s), or other communication means coupled to a network 126, such as a local area network (LAN), wide area network (WAN), or the Internet. Other communication implementations are also possible.

A client device 150*a*, 150*b* may comprise a data processing system having one or more CPUs or processors coupled to one or more user I/O devices and memory devices. Examples of representative I/O devices may include, but are not limited to, keyboards, displays, monitors, touch screens, printers, electronic pointing devices such as mice, trackballs, styluses, touch pads, or the like. Examples of memory devices may include, but are not limited to, HDs, magnetic disk drives, optical disk drives, magnetic cassettes, tape drives, flash memory cards, RAMs, ROMs, smart cards. Such a data processing system may be coupled to a display, an information device, and various peripheral devices such as printers, plotters, speakers, etc. through appropriate I/O devices. Furthermore, such a data processing system may also be coupled to external computers or other devices through network interface(s), wireless transceiver(s), or other communication means coupled to a network, such as a LAN, WAN, or the Internet. Other communication implementations are also possible.

While FIG. 1 illustrates client applications 154*a* and 154*b* as being on different client devices 150*a*, 150*b*, client applications 154*a* and 154*b* may run on the same client device. Thus, embodiments may provide for efficient access by a second application based on navigation in a first application where the second application cannot directly access the location from the first application, such as might occur if the applications are sandboxed. It can be further noted that the second application (e.g., client application 154*b*) may be a limited access application in that the second application may have more limited ability to access locations than the first application. For example, client application 154*b* may only be capable of uploading content to locations but not reading the content of locations, while client application 154*a* can both read the content of a location and upload content to the location.

Figure 2:
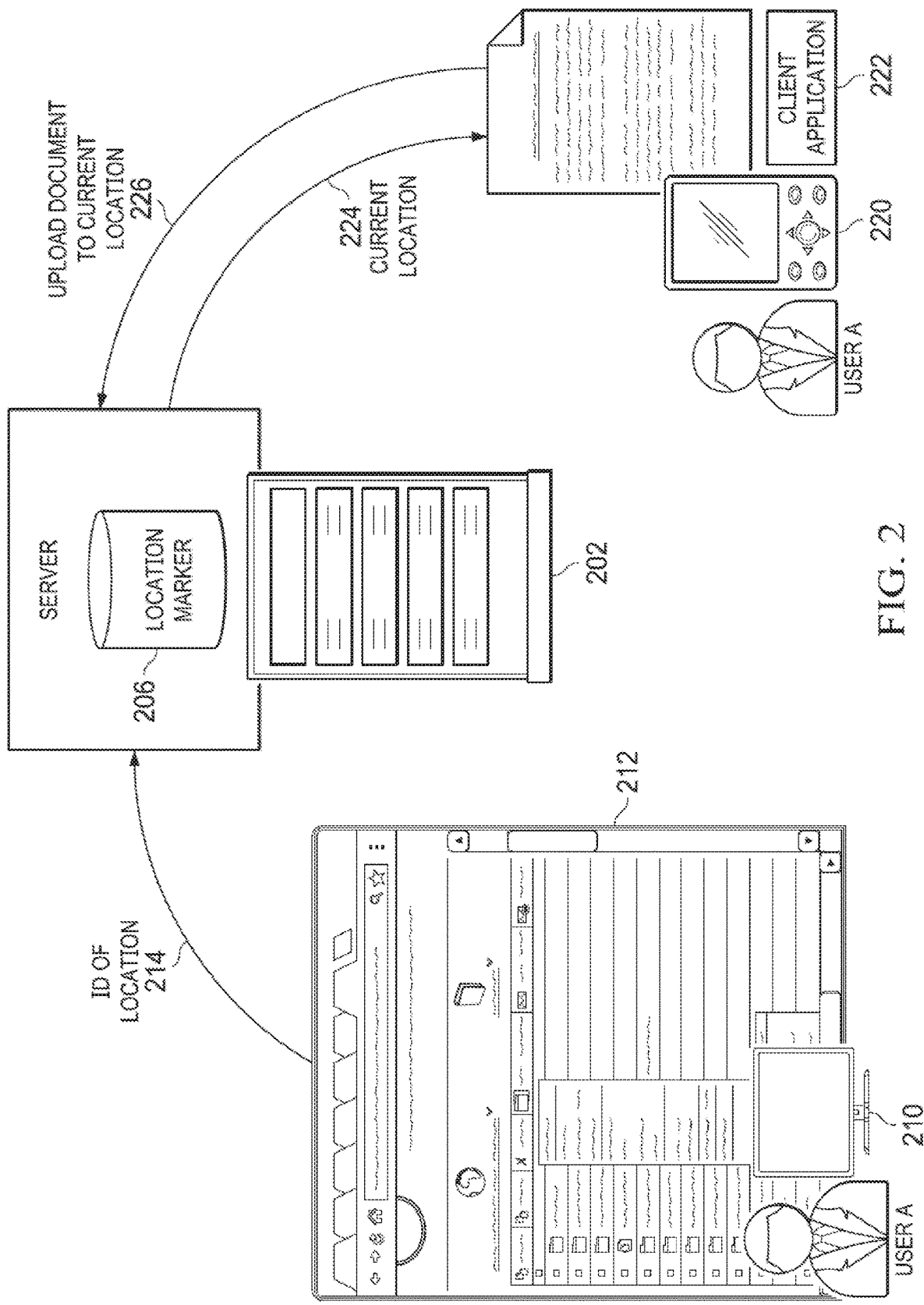
FIG. 2 is a diagrammatic representation of one embodiment of a system providing implicit location marking.

FIG. 2 is a diagrammatic representation of one embodiment of a system utilizing implicit current location marking. The system of FIG. 2 comprises a content management server 202, a first client device 210 (e.g., a laptop or desktop personal computer) and a mobile smart phone 220. Server 202 may be an example of content management server 102 and first client computer 210 and mobile smart phone 220 may be examples of client devices 150*a*, 150*b*.

Client device 210 comprises a web browser 212 that User A can use to access managed content at server 202 through a web-based interface. In the example illustrated, server 202 provides a navigation hierarchy that is presented in a graphical user interface (GUI) as a hierarchy of folders and files. It can be noted that content management system folders or files can be "virtual" folders or files that do not correspond to actual file directory paths in a file system (e.g., a file system of data store 110 of FIG. 1). The particular folders and files presented to the user depend on User A's credentials.

When User A requests access to a folder or file via the web browser (e.g., by clicking on the folder or file in the GUI), web browser 212 sends a request server 202 that includes an object id for the requested folder or file (indicated at 214) and server 202 generates a responsive web page to present the contents of a requested folder or file in the GUI. Server 202 further maintains a location marker 206 associated with the user's account that contains the identity of the last container object (say folder) accessed by the user via the web-based interface.

Mobile smart phone 220 includes an imaging client application 222 (e.g., a scanning application) that can access mobile smart phone 220's camera. The imaging client application 222 is configured to log on to server 202 using credentials for User A and request the marked location for User A. One or more of the log in and request may occur in response to User A opening imaging client application 222, capturing an image with imaging client application 222 or selecting to upload an image captured by imaging client application 222. In response, server 202 provides location marker 206 for User A to imaging client application 222 (as indicated at 224). Imaging application 222 automatically set the target location for the image upload request to the marked location and uploads an image (represented at 226). Thus, imaging application 222 can automatically upload the image to the folder currently being viewed by User A in web browser 212.

In another embodiment, imaging application 222 may present an indicator of the marked location specified by current location marker 206 for User A. The user may then select whether to upload an image to the marked location or navigate to some other location.

Figure 3:
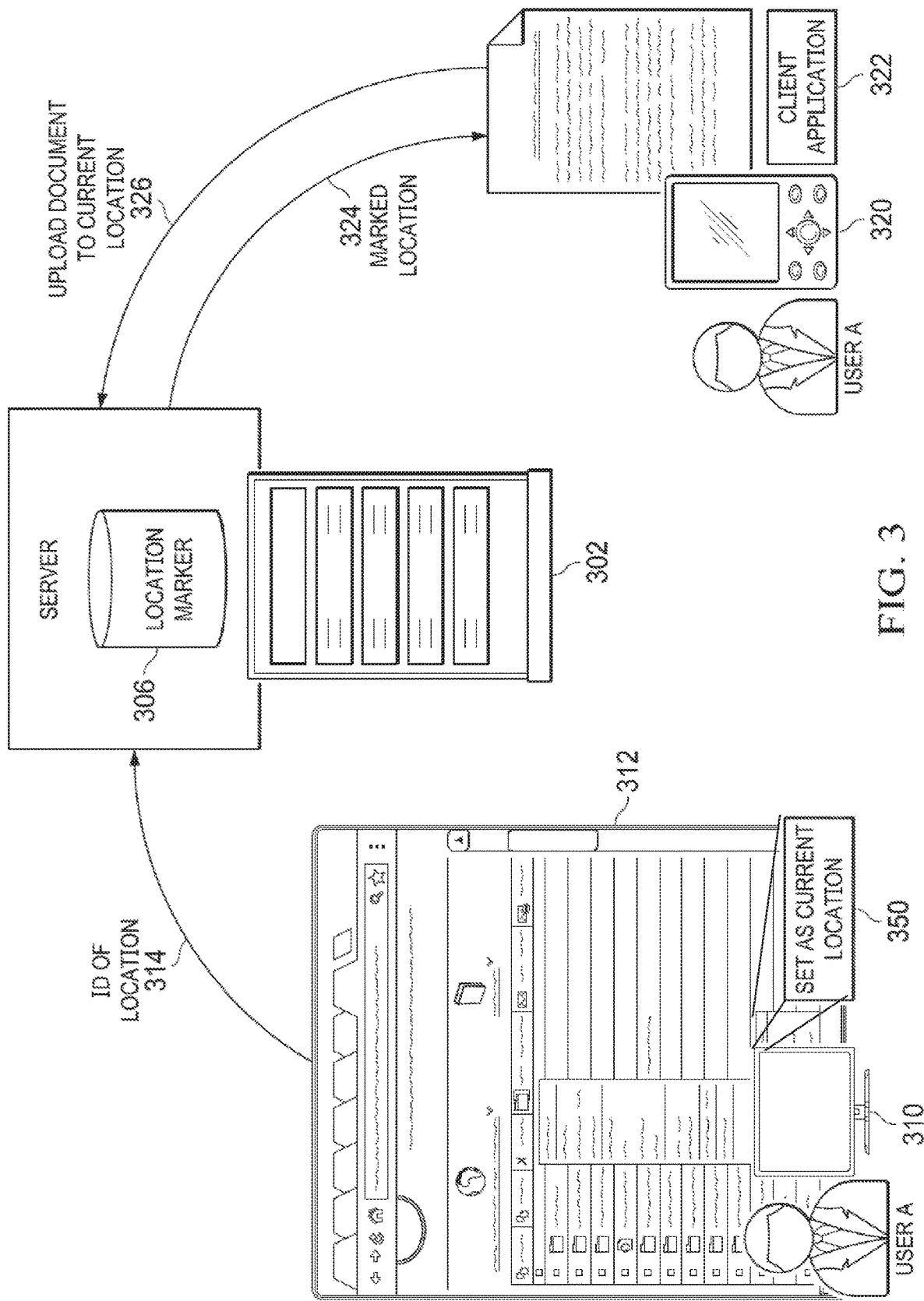
FIG. 3 is a diagrammatic representation of one embodiment of a system providing explicit location marking.

FIG. 3 is a diagrammatic representation of one embodiment of a system utilizing explicit location marking. The system of FIG. 3 comprises a content management server 302, a first client device 310 (e.g., a laptop or desktop personal computer) and a mobile smart phone 320. Server 302 may be an example of content management server 102 and first client device 310 and mobile smart phone 320 may be examples of client devices 150a, 150b.

The embodiment of FIG. 3 is similar to that of FIG. 2, except that the web page provided to browser 312 includes context menus 350 or other controls for container objects that allow the user to mark container objects as a "marked location." When User A designates a container as a marked location, the web browser 312 sends a request to server 302 that includes an object id for the container (indicated at 314). Server 302 maintains a location marker 306 associated with the user's account that contains the identity of the last container object selected by User A to be marked or some number of container objects selected by User A to be marked.

Mobile smart phone 320 includes an imaging client application 322 (e.g., a scanning application) that can access mobile smart phone 320's camera. The imaging client application 322 is configured to log on to server 302 using credentials for User A and request User A's current location marker. One or more of the log in and request may occur in response to User A opening imaging client application 322, capturing an image with imaging client application 322 or selecting to upload an image captured by imaging client application 322. In response, server 302 can provide location marker 306 for User A to imaging client application 322.

Imaging client application 322 may present an indicator of the marked location(s) specified by location marker 306 to the User A. The user may then select whether to upload an image to one of the marked locations or to navigate to some other location. Imaging client application 322, responsive to the selection of a target location and capturing of an image, may upload the image to the selected location (indicated at 326).

In the embodiments of FIG. 2 and FIG. 3, an imaging application is provided by way of example. Any application configured to access a content management system can incorporate a marked location. Furthermore, while embodiments have been discussed primarily in terms of applications running on different computing devices, the applications may run on the same computing device. For example, both the web browser and imaging app can run on the same computing device (e.g., PC or mobile device). Furthermore, while implicit location marking and explicit location marking were discussed as separate embodiments, a content management system may both track a current location and allow a user to mark locations.

Figure 4A:
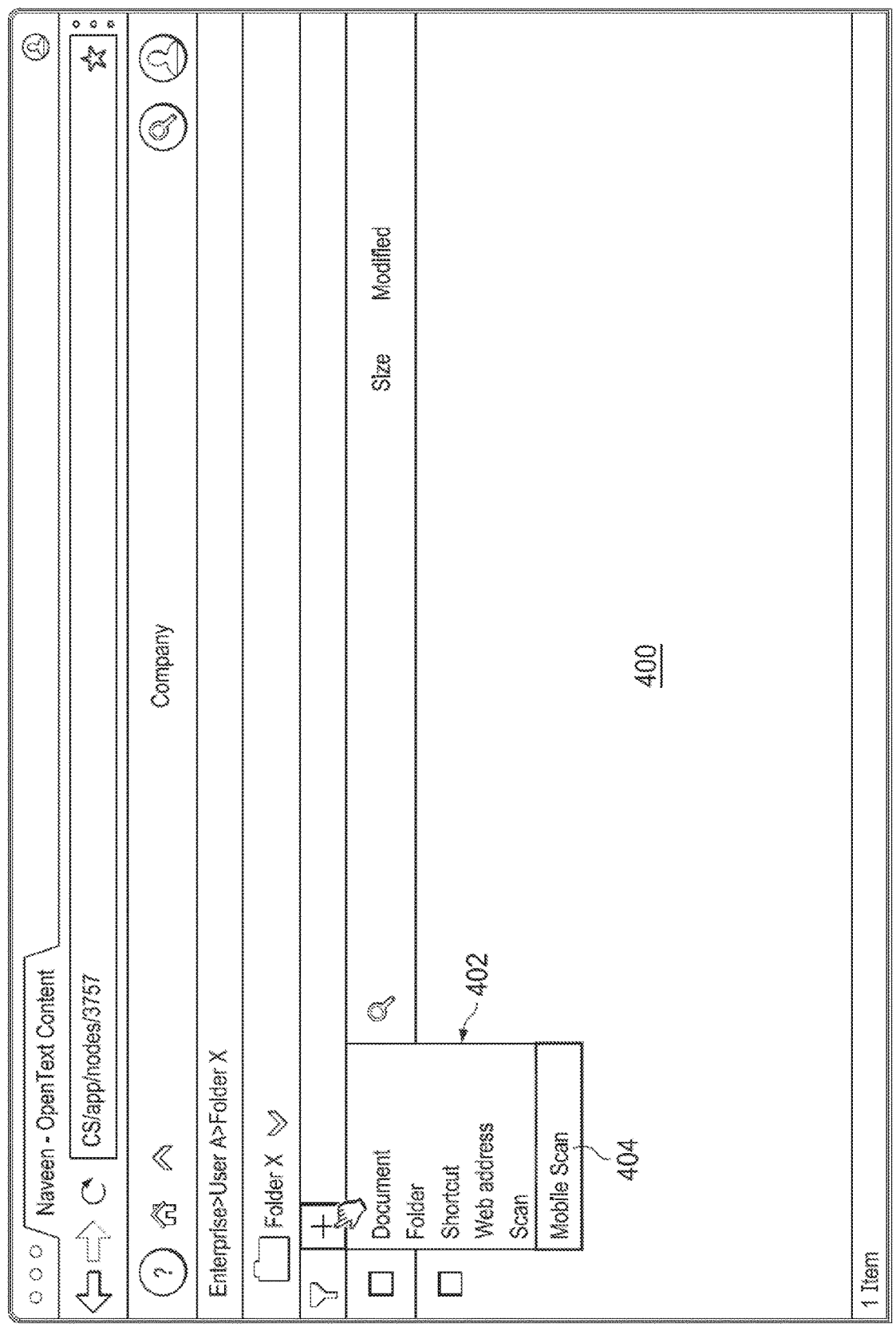
FIG. 4A illustrates one embodiment of a user interface corresponding to a selected container.

FIG. 4A, FIG. 4B, FIG. 4C, FIG. 4D, FIG. 4E and FIG. 4F illustrate example user interfaces according to one embodiment. FIG. 4A illustrates a user interface 400 corresponding to a selected container provided via a web browser or other client application. In this example, User A has an entry point in a content management structure of "Enterprise," representing an enterprise-wide entry point. When User A navigates to User A>Folder X in a content navigation hierarchy, the content server returns a user interface 400 (e.g., one or more web pages) corresponding to Folder X. In this example, Folder X is empty.

Figure 4B:
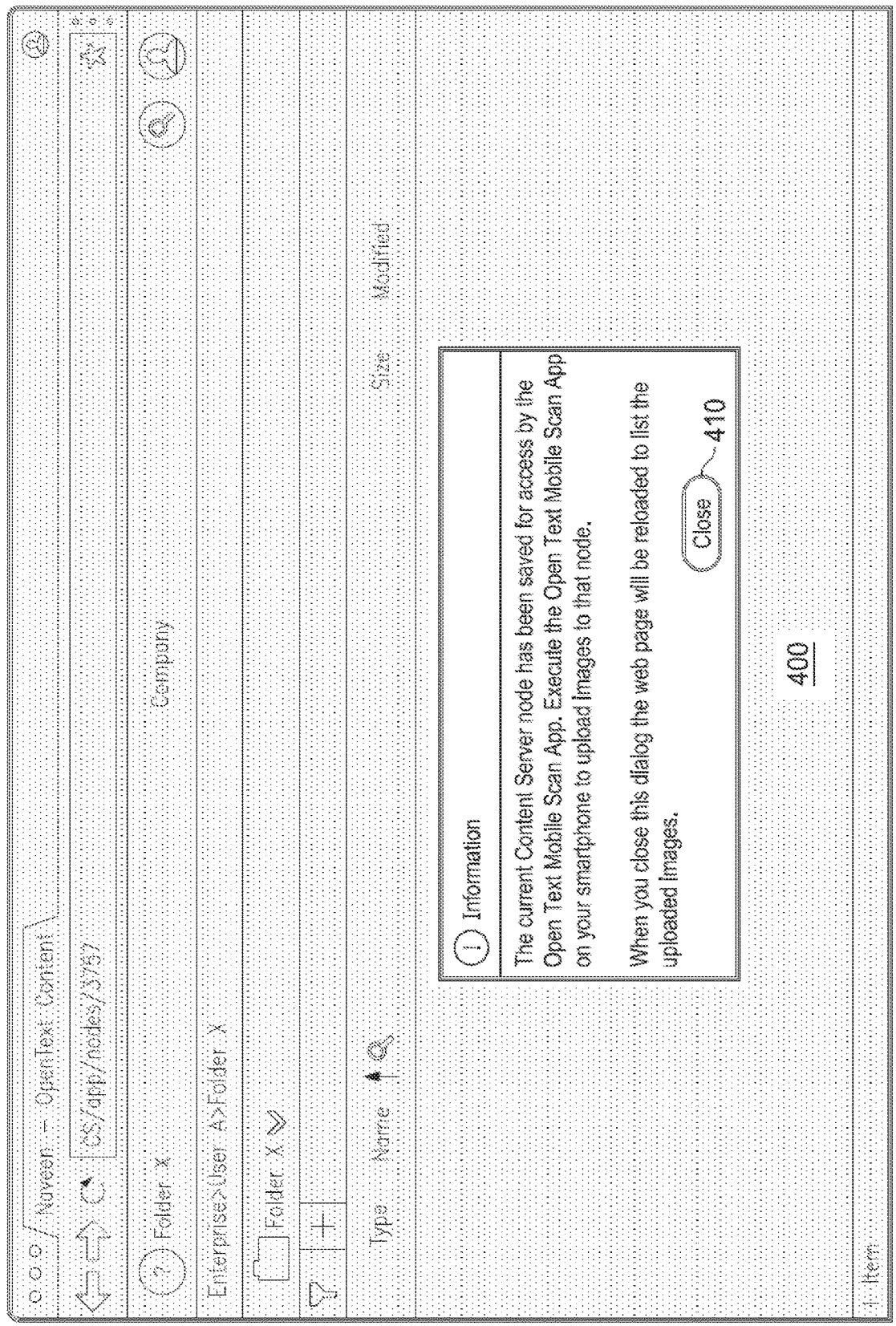
FIG. 4B illustrates an example interface after a user has designated a container to be marked as a marked location.

In an implicit location marking embodiment, the content server can set the location marker for User A to an id for Folder X when it receives a request associated with User A to access Folder X. In an explicit location marking embodiment, the user interface 400 includes a control to allow the user to designate Folder X as the marked location. In the particular example illustrated, the control comprises a context menu 402 with a "Mobile Scan" menu item 404. In response to a user interaction in user interface 400 indicating that the "Mobile Scan" menu item has been selected, the client application sends a request to the content management server to mark Folder X as the current location for User A and the content management server updates a location marker for User A with a reference to Folder X. FIG. 4B illustrates an example interface 400 after the selection of the "Mobile Scan" menu item 404. The content management server maintains Folder X as the marked location for User A until the user selects the "close" virtual button 410 or other predefined event occurs.

Figure 4C:
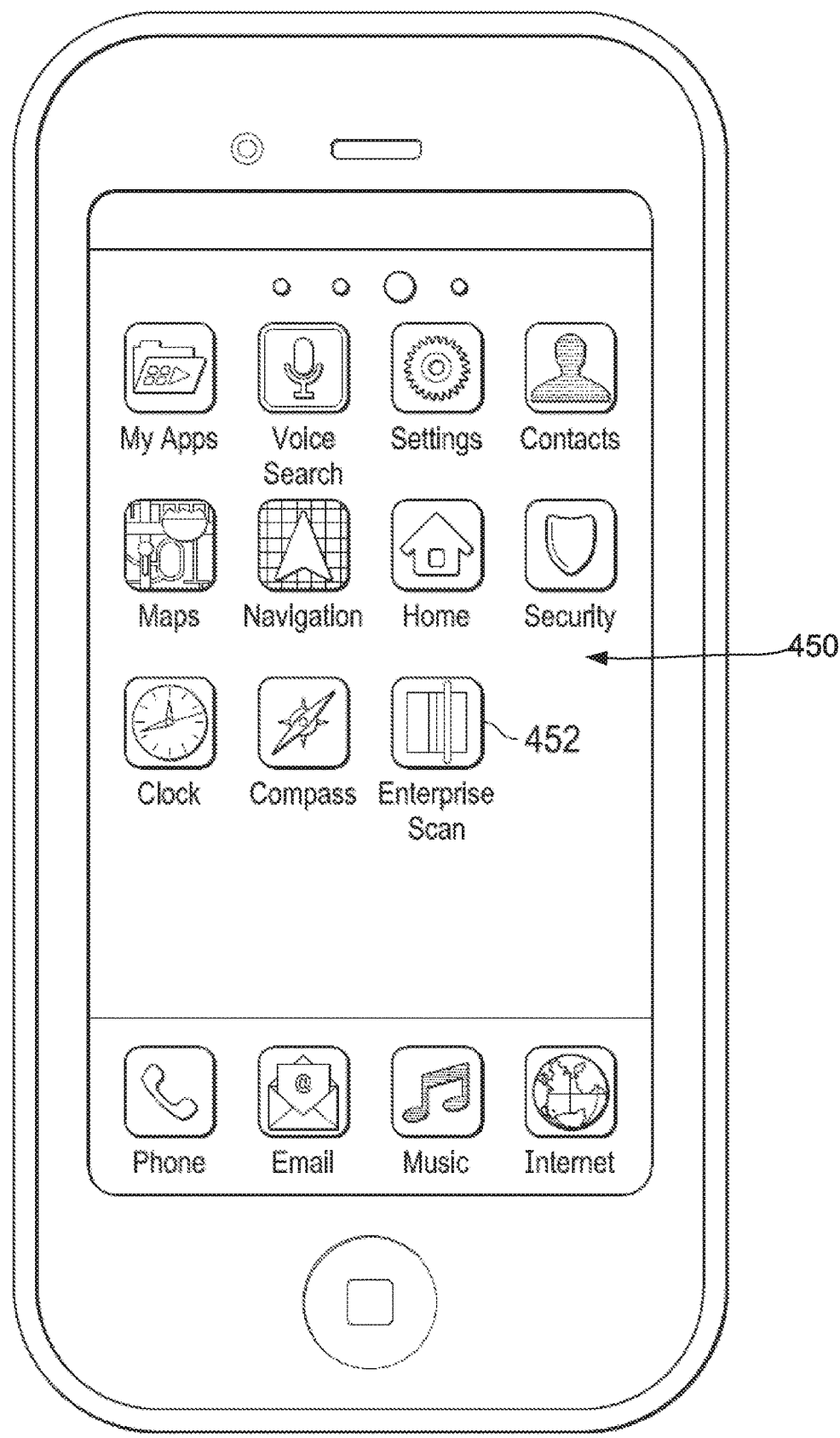
FIG. 4C illustrates an example of a mobile device interface in which a user may select a second client application to execute.
Figure 4D:
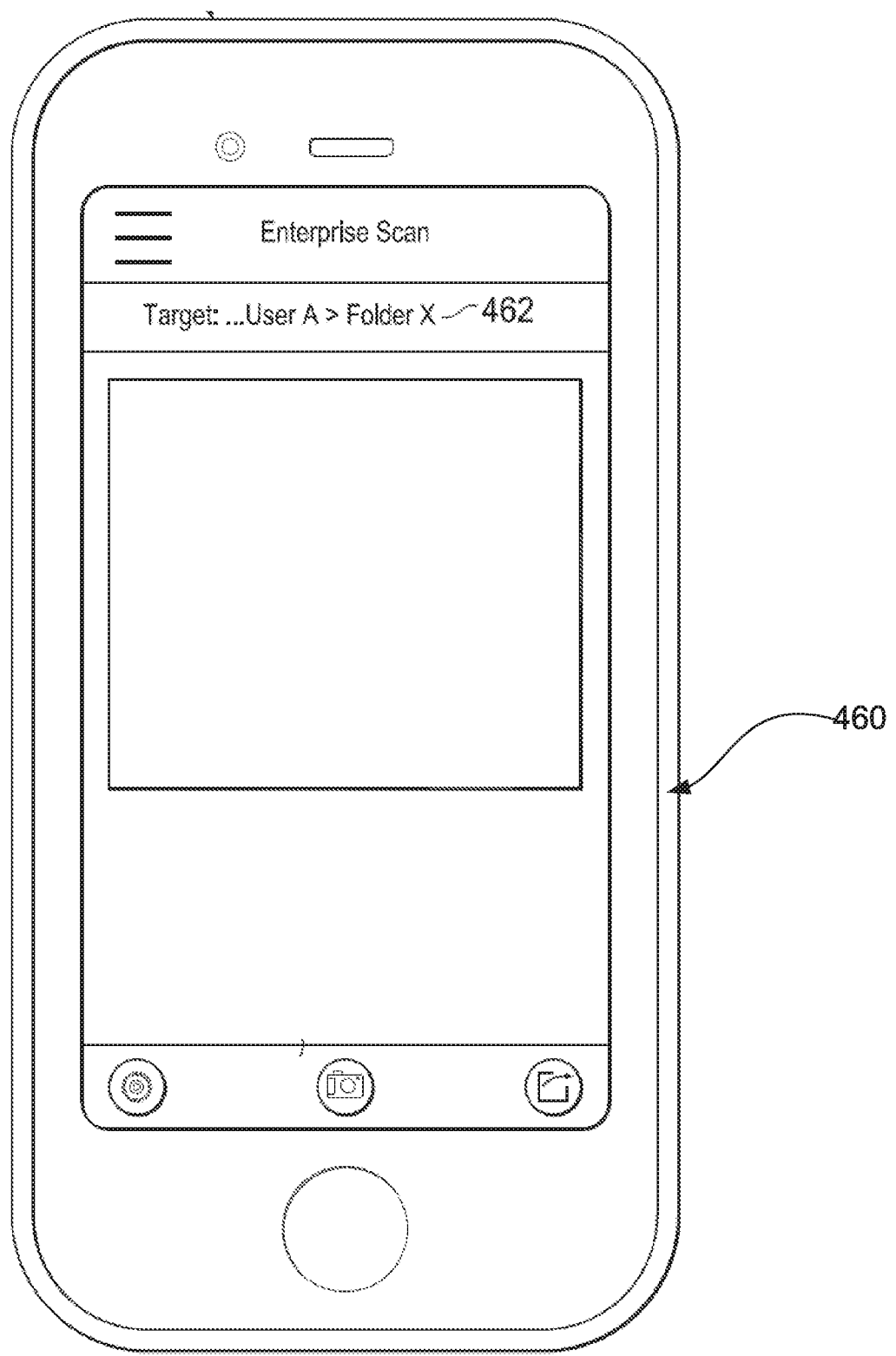
FIG. 4D illustrates an example application interface showing that a target location set to a marked location.
Figure 4E:
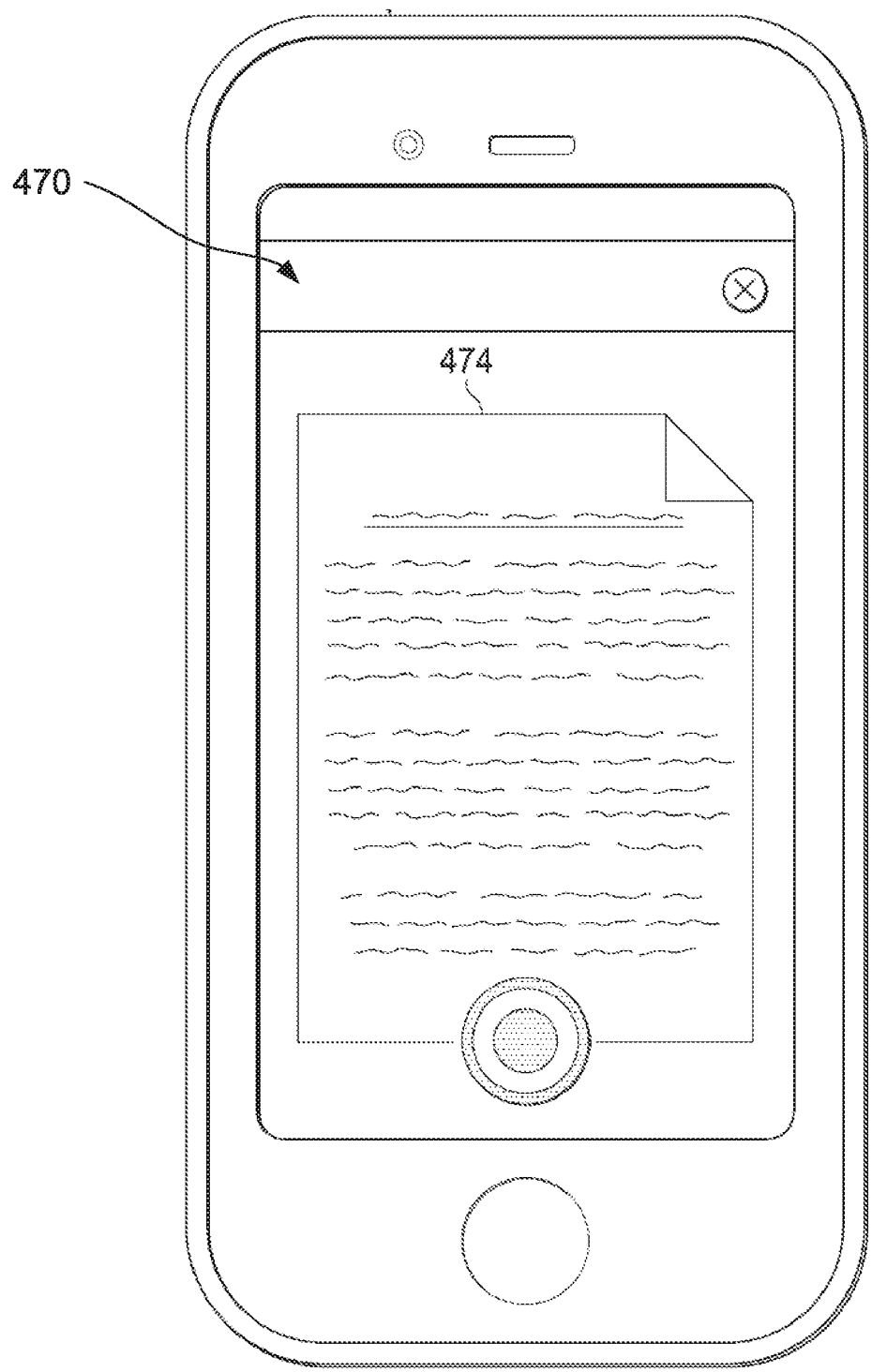
FIG. 4E illustrates an example application interface for scanning a document.

FIG. 4C illustrates one example of a mobile device interface 450 in which the user can select a second application, in this case a scanning application 452 ("Enterprise Scan"). The scanning application 452 is configured to log on to the content management server on behalf of User A. When scanning application 452 logs on to the content management server, scanning application requests, through the API for the content management application, the scan location associated with User A. The content management server responds with the location specified in the location marker for User A. FIG. 4D depicts an example scanning application interface 460 illustrating that the scanning target 462 has been set to the location indicated by the location marker associated with User A. In some embodiments, the user may be given the option to change the target location. The user can scan a document to the automatically set or user selected target location. FIG. 4E illustrates an example scanning application interface 470 for scanning a document 474. When document 474 has been scanned, scanning application 452 uploads a file of the scanned document to the target location.

Figure 4F:
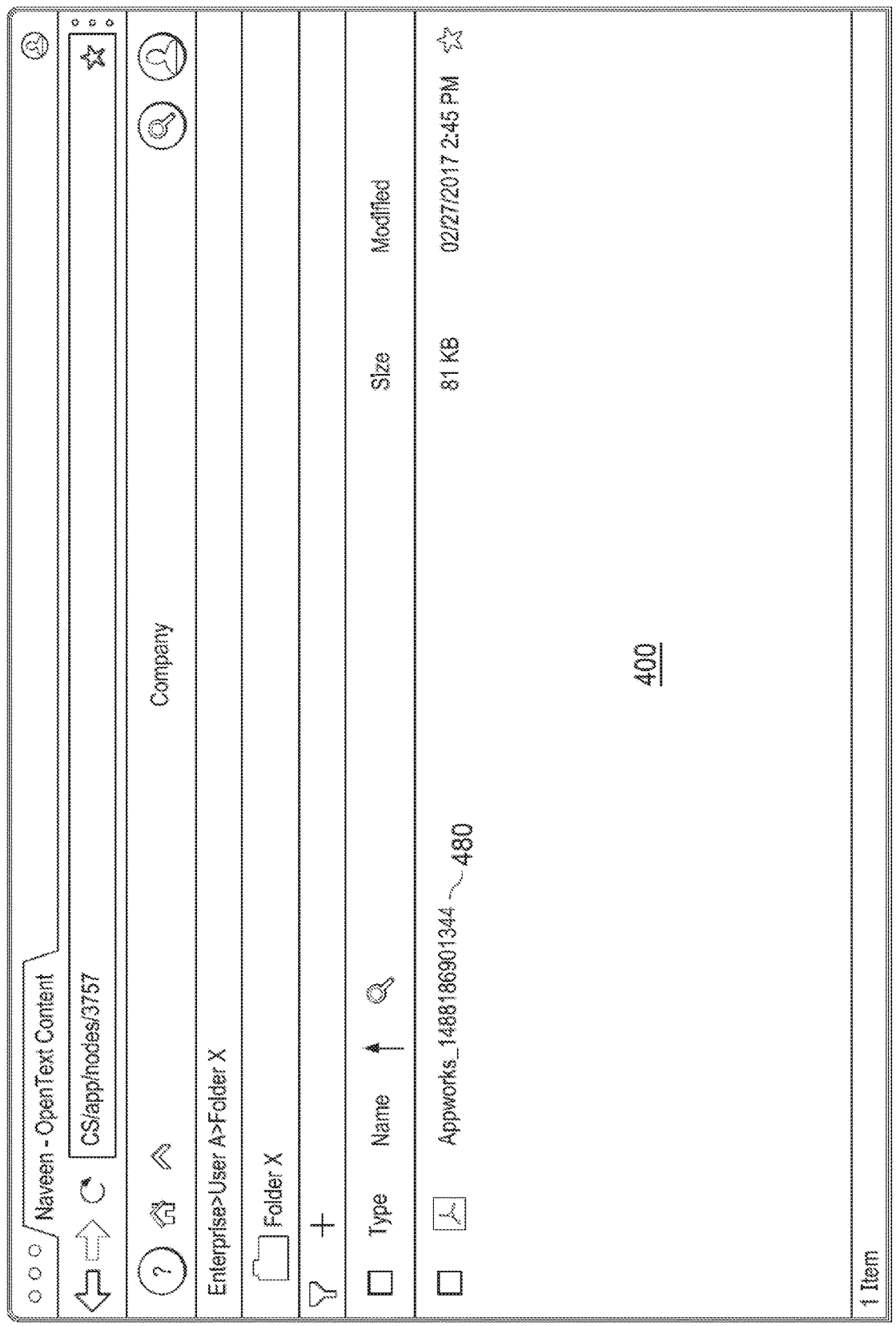
FIG. 4F illustrates an example interface updated to show that a document has been uploaded to a marked location.

Returning to FIG. 4B, responsive to the user clicking close button 410, the first application sends a request to the content management server requesting that interface 400 be refreshed. The content management server can generate an updated interface 400 for Folder X and provide the refreshed interface 400 to the browser. The content management server 400 can also cancel the location marker for User A (e.g., the location marker is set to null or to the entry point for the user). FIG. 4F illustrates an example of an updated interface 400 showing that Folder X now contains a file (represented by 480) for the scanned document 474.

Figure 5:
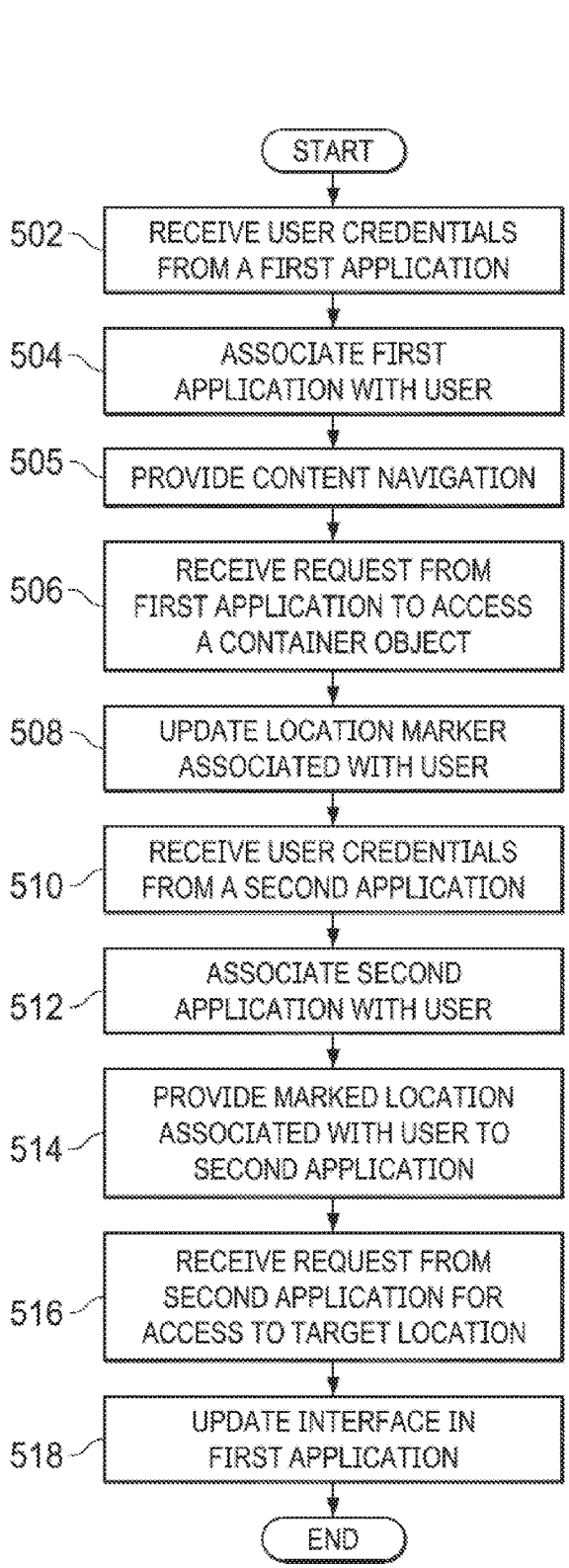
FIG. 5 is a flow diagram illustrating one embodiment of a location marking method.

FIG. 5 is a flow chart illustrating one embodiment of a method that can be implemented at a content management server 102. Server 102 can receive a login request from a first application using a set of user credentials for a user (step 502). If the user authenticates, server 102 associates the first application with the user (step 504). This may include for example, tracking user and session data, providing session cookies or otherwise correlating the first application with the user. Furthermore, content management server can provide a content navigation structure to the first application, where the content navigation structure comprises objects accessible by the user (step 505). The content navigation structure may be presented, for example, in one or more web pages, one or more application pages or other user interfaces.

As the user navigates the content navigation structure, requesting access to various containers, the first application can send access requests to server 102. As such, server 102 may receive requests from the first application to access container objects (step 506). The requests may comprise, for example, API requests that include object ids for the objects being accessed. Server 102 can therefore track a current location for the user by, for example, maintaining a location marker in association with the user's account that stores an object id for the last (qualifying) container object accessed by the user via the first application (step 508).

Server 102 can further receive a login request from a second application where the login request from the second application includes a set of user credentials for the same user (step 510). If the second application authenticates, server 102 associates the second application with the user (step 512). Server 102 can further provide the marked location associated with the user in response to a request by the second application (step 514). The request by the second application may simply be a login request though, in another embodiment, the request for the current location may be a specific command programmed in the API to request the marked location. Server 102 may then receive an access request from the second application for access to a target location, where the target location is the marked location previously passed by the server 102 to the second application (step 516). Server 102 processes the access request as it would any other access request for access to a target location. At step 518, server 102 can provide an updated interface to the first application representing the access request by the second application. As the first application navigates the content navigation structure, the server 102 can continually update the location marker.

In another embodiment, server 102 does not provide the marked location to the second application. Instead, at step 516 the server receives an access request with an indicator that the marked location should be used without the second application specifying the marked location. The server 102 can then resolve the marked location for the user and provide the appropriate access. The steps of FIG. 5 may be repeated as needed or desired.

Figure 6:
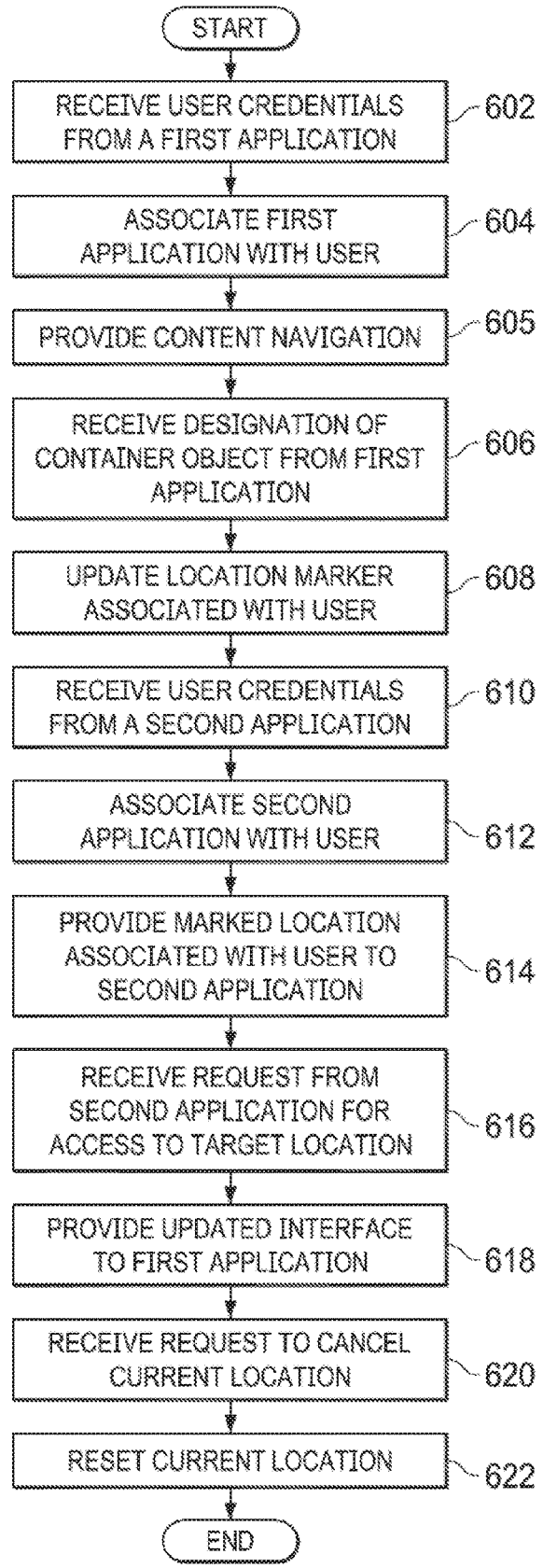
FIG. 6 is a flow diagram illustrating another embodiment of a location marking method.

FIG. 6 is a flow chart illustrating one embodiment of a method that can be implemented at a content management server 102. Server 102 can receive a login request from a first application using a set of user credentials for a user (step 602). If the user authenticates, server 102 associates the first application with the user (step 604). This may include for example, tracking user and session data, providing session cookies or otherwise correlating the first application with the user. Furthermore, content management server can provide a content navigation structure to the first application, where the content navigation structure comprises objects accessible by the user (step 605). The content navigation structure may be presented, for example, in one or more web pages, one or more application pages or other user interfaces.

At step 606, server 102 receives a request based on a user interaction with the first application, the request designating a container object to mark as a current location. The request may comprise, for example, an API request that includes the object id for a container currently being accessed via the first application. Server 102 can therefore track a current location for the user by, for example, maintaining a location marker in association with the user's account that stores an object id for the container object designated by the user via the first application (step 608).

Server 102 can further receive a login request from a second application where the login request from the second application includes a set of user credentials for the same user (step 610). If the second application authenticates, server 102 associates the second application with the user (step 612). Server 102 can further provide the marked location associated with the user in response to a request by the second application (step 614). The request by the second application may simply be a login request though, in another embodiment, the request for the current location may be a specific command programmed in the API to request the marked location. Server 102 may then receive an access request from the second application for access to a target location, where the target location is the marked location previously passed by server 102 to the second application (step 616). Server 102 processes the access request as it would any other access request for access to a target location. At step 618, server 102 can provide an updated interface to the first application representing the access request by the second application. Server 102 may further receive a request from the first or second application to cancel the marked location (step 620) and reset the location marker for the user (step 622). As discussed above with respect to FIG. 4B and FIG. 4G, a request to update an interface for a container from a first application associated with a user may also be processed as a request to reset the location marker associated with a user.

In another embodiment, server 102 does not provide the marked location to the second application. Instead, at step 616 the server receives an access request with an indicator that the marked location should be used without the second application specifying the marked location. The server 102 can then resolve the marked location for the user and provide the appropriate access. The steps of FIG. 6 may be repeated as needed or desired.

Figure 7:
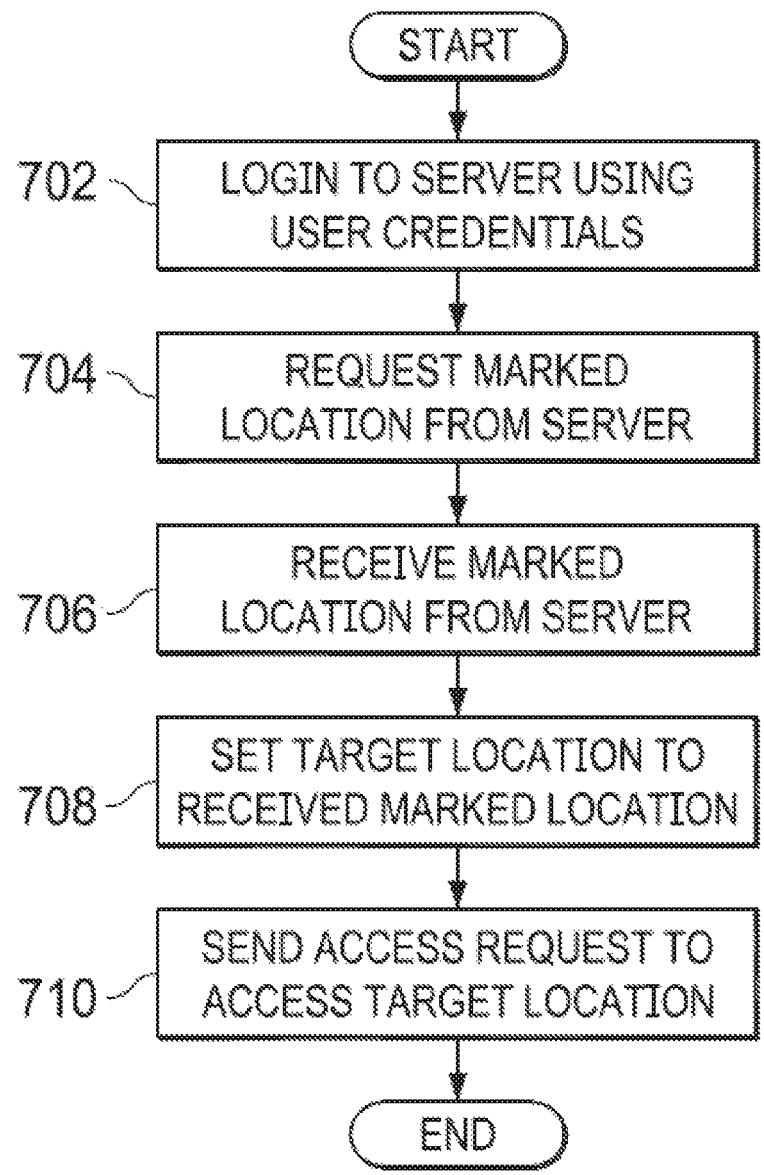
FIG. 7 is a flow chart illustrating one embodiment of a method for a second application to access a location based on activity by a first application.

FIG. 7 is a flow chart illustrating one embodiment of a method that may be performed by a client application, for example, a second application 154*b* in interacting with a server storing a marked location set based on activity in a first application. The client application may login to server 102 on behalf of the user (step 702) using previously stored credentials or credentials provided by the user in response to a prompt. If the login is successful, client application may make a request, such as an API call or other request, to server 102 for a marked location (step 704) and receive the marked location associated with the user in response (step 706). In some embodiments, server 102 provides the marked location to client application as part of the handshake process when the client application logs in.

If no marked location is provided, the client application may set the initial target location as the entry point for the user to the content navigation structure. If a marked location is specified, the client application may automatically set a target location for an access request, such as a request to retrieve or upload content, to the marked location received from server 102 (step 708). Based on user interaction in the client application or occurrence of another event, the client application sends the access request to access the target location (step 710). The second application (e.g., client application 154*b*) may thus access a location in the content management structure based on navigation by another application (e.g., first application 154*a*).

As noted above, in another embodiment, the client application does not receive the marked location, but instead sends an access request with an indicator that the server 102 should use the marked location. Server 102 can then determine the marked location associated with the user and provides the requested access to the marked location. The steps of FIG. 7 may be repeated as needed or desired.

Figure 8:
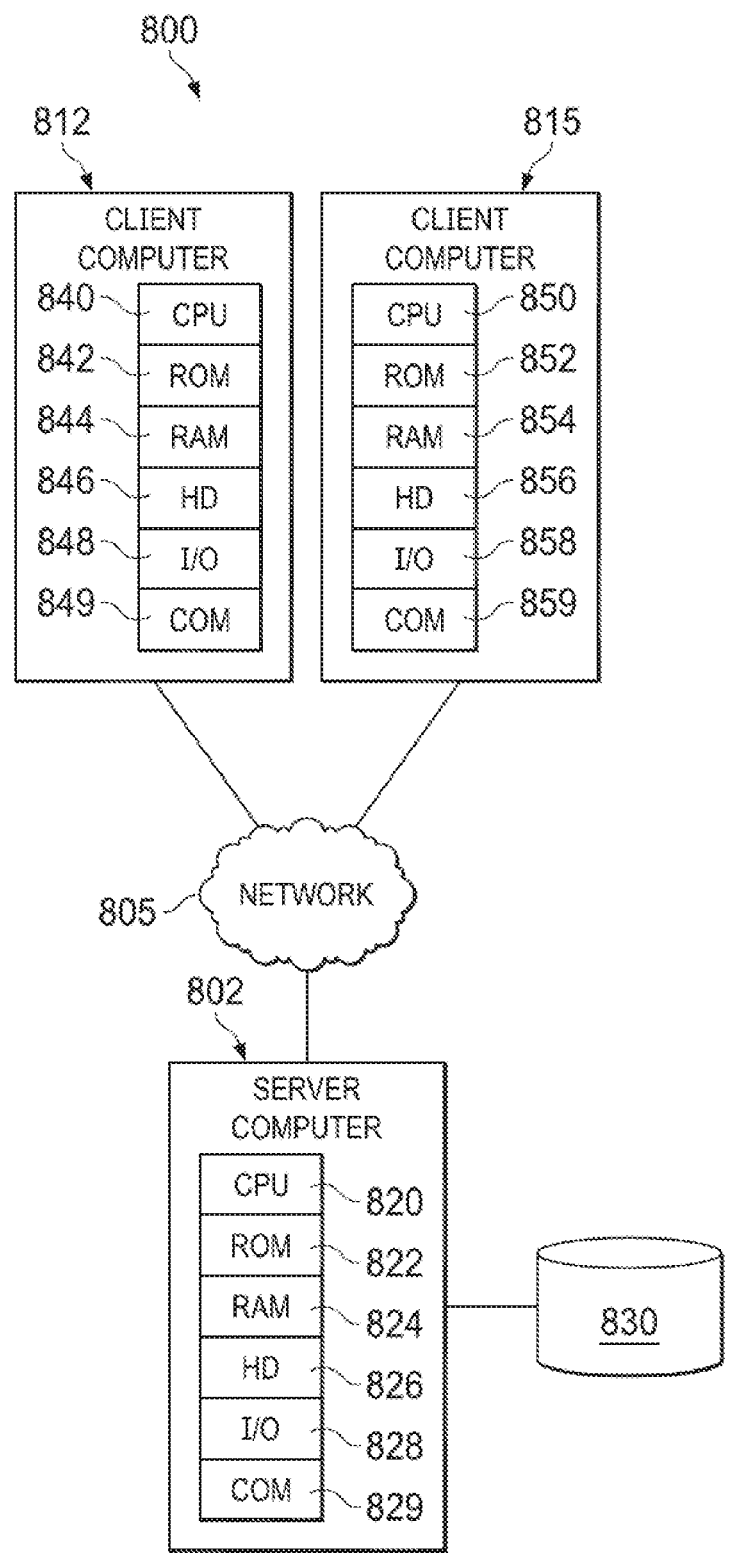
FIG. 8 is a diagrammatic representation of a networked computer environment.

FIG. 8 depicts a diagrammatic representation of a distributed network computing environment 800 where embodiments disclosed herein can be implemented. In the example illustrated, network computing environment 800 includes network 805 that can be bi-directionally coupled to client computers 812, 815 and server computer 802. Network 805 may represent a combination of wired and wireless networks that network computing environment 800 may utilize for various types of network communications known to those skilled in the art. For the purpose of illustration, a single system is shown for each of computer 802, 812, and 815. However, with each of computer 802, 812 and 815 may comprise a plurality of computers (not shown) interconnected to each other over network 805. For example, a plurality of computers 802, a plurality of computers 812 and a plurality of computers 815 may be coupled to network 805. Computers 812, 815 may include data processing systems for communicating with computer 802.

Server computer 802 can include can include CPU 820, ROM 822, RAM 824, HD or storage memory 826, I/O 828 and communication interface 829. I/O 828 can include a keyboard, monitor, printer, electronic pointing device (e.g., mouse, trackball, stylus, etc.), or the like. Communications interface may include a communications interface, such as a network interface card, to interface with network 805. Computer 802 may provide a variety of services to computers 812, 815 over network 805. These services may utilize data stored in data store 830. According to one embodiment, server computer 802 may include computer executable instructions stored on a non-transitory computer readable medium coupled to a processor. The computer executable instructions of server 802 may be executable to provide a content management application, such as content management application 104. The content management application can manage an object data store in which containers and content are managed as objects. A container may be a workspace, a project, a folder, a business object, an entity instance, or other container tracked by an identifier that identifies the container in the particular environment. The computer executable instructions can be executable to track a marked location for user based on activity of a first application associated with a user to enable access to the marked location based on the activity in the first application.

Computer 812 can comprise CPU 840, ROM 842, RAM 844, HD 846, I/O 848 and communications interface 849. I/O 848 can include a keyboard, monitor, printer, electronic pointing device (e.g., mouse, trackball, stylus, etc.), or the like. Communications interface 849 may include a communications interface, such as a network interface card, to interface with network 805. Computer 815 may similarly include CPU 850, ROM 852, RAM 854, HD 856, I/O 858 and communications interface 859. According to one embodiment, client computers 812, 815 run client applications, such as client applications 154a, 154b.

Each of the computers in FIG. 8 may have more than one CPU, ROM, RAM, HD, I/O, or other hardware components. For the sake of brevity, each computer is illustrated as having one of each of the hardware components, even if more than one is used. Each of computers 802, 812 and 815 is an example of a data processing system. ROM 822, 842, and 852; RAM 824, 844, and 854; HD 826, 846, and 856; and data store 830 can include media that can be read by CPU 820, 840, or 850. These memories may be internal or external to computers 802, 812, or 815.

Portions of the methods described herein may be implemented in suitable software code that may reside within ROM 822, 842, or 852; RAM 824, 844, or 854; or HD 826, 846, or 856. In addition to those types of memories, the instructions in an embodiment disclosed herein may be contained on a data storage device with a different computer-readable storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof. The computer-executable instructions may be stored as software code components or modules on one or more computer readable media.

As one skilled in the art can appreciate, a computer program product implementing an embodiment disclosed herein may comprise one or more non-transitory computer readable media storing computer instructions translatable by one or more processors in a computing environment. ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like.

In one embodiment, the computer-executable instructions may include lines of compiled code according a selected programming language. Any suitable programming language can be used to implement the routines, methods or programs of embodiments of the invention described herein. Different programming techniques can be employed such as procedural or object oriented.

Particular routines can execute on a single processor or multiple processors. For example, various functions of the disclosed embodiments may be distributed. Communications between systems implementing embodiments can be accomplished using any electronic, optical, radio frequency signals, or other suitable methods and tools of communication in compliance with various protocols.

Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

Although the present invention has been described in detail, it should be understood that various changes, substitutions and alterations can be made hereto without departing from the spirit and scope of the invention as defined by the appended claims.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A server comprising:
   a processor;
   a data store;
   a memory having stored thereon instructions executable by the processor of the server to:

associate a first client application executing a first client device with a user from a plurality of users based on the first client application authenticating with a first credential for the user;
during a session between the server and the first client application associated with the user from the plurality of users:
provide a content navigation structure for the user, the content navigation structure representing a set of user accessible objects selected, based on the user, from a set of managed objects managed by a content management system, the set of user accessible objects comprising an entry point container for the user and a set of user accessible folders below the entry point container in a hierarchy;
provide a user interface corresponding to the entry point container to the first client application associated with the user;
receive a request over a network from the first client application associated with the user to access a first folder in the content navigation structure, the first folder selected from the set of user accessible folders; and
mark a location in the content navigation structure for the user by adding an identifier for the first folder to a location marker maintained for the user at the server and updated for the user by the server based on navigation of the content navigation structure by the user in the first client application, wherein the location marker tracks a current location of the user in the content navigation structure during the session with the first client application;
associate a second client application executing on a second client device with the user based on the second client application authenticating with a second credential for the user; and
while the session with the first client application remains open, provide the identifier for the first folder from the location marker over the network to the second client application to enable the second client application to upload content to the current location of the user in the content navigation structure in the session with the first client application without navigating through the content navigation structure from the entry point container for the user to the marked location.

2. The server of claim 1, wherein the instructions are executable to mark the first folder from the set of user accessible folders as the marked location based on a designation of the first folder by the first client application.

3. The server of claim 1, wherein the second client application is a mobile imaging application.

4. The server of claim 1, wherein the content navigation structure includes a default location for the user and the marked location is different than the default location.

5. The server of claim 1, wherein the instructions are further executable to provide an updated interface to the first client application based on activity by the second client application with respect to the first folder.

6. The server of claim 1, wherein the instructions are executable to provide the identifier for the first folder from the location marker to the second client application during a log in handshake process with the second client application.

7. A system comprising:
a first client application on a first client device;
a second client application on a second client device; and
a server configured to:
associate the first client application with a user from a plurality of users based on the first client application authenticating with a first credential for the user;
manage content and provide a content navigation structure for the user, the content navigation structure representing a set of user accessible objects selected, based on the user, from a set of managed content, the content navigation structure comprising an entry point container for the user and set of user accessible folders below the entry point container in a hierarchy;
during a session with the first client application associated with the user:
provide a user interface corresponding to the entry point container to the first client application associated with the user;
receive a request from the first client application associated with the user to access a first folder in the content navigation structure, the first folder selected from the set of user accessible folders;
mark a location in the content navigation structure for the user by adding an identifier for the first folder to a location marker maintained for the user at the server and updated for the user by the server based on navigation of the content navigation structure in the first client application by the user, wherein the location marker tracks a current location of the user in the content navigation structure during the session with the first client application;
associate the second client application with the user based on the second client application authenticating with credentials associated with the user;
while the session with the first client application remains open, provide the identifier for the first folder from the location marker to the second client application to enable the second client application to upload content to the current location of the user in the content navigation structure during the session with the first client application; and
wherein the second client application is executable to:
authenticate with the server using the credentials associated with the user;
receive, from the server, the identifier for the first folder added to the location marker by the server during the session with the first client application;
automatically access the first folder without navigating through the content navigation structure from the entry point container for the user to the first folder based on receiving, from the server, the identifier from the location marker; and
upload content to the first folder.

8. The system of claim 7, wherein the marked location comprises a designated location designated by the first client application.

9. The system of claim 7, wherein the second client application is a mobile imaging application.

10. The system of claim 7, wherein the content navigation structure includes a default location for the user and the marked location is different than the default location.

11. The system of claim 7, wherein the server is further configured to provide an updated interface to the first client application based on activity by the second client application with respect to the first folder.

12. The system of claim 7, wherein the server is configured to provide the identifier for the first folder from the location marker to the second client application during a log in handshake process with the second client application.

13. A computer program product comprising a non-transitory computer readable medium storing instructions executable to cause a server to:
- associate a first client application executing on a first client device with a user from a plurality of users based on the first client application authenticating with a first credential for the user;
- during a session between the server and the first client application associated with the user from the plurality of users:
  - provide a content navigation structure for the user, the content navigation structure representing a set of user accessible objects selected, based on the user, from a set of managed objects managed by a content management system, the set of user accessible objects comprising an entry point container for the user and a set of user accessible folders below the entry point container in a hierarchy;
  - provide a user interface corresponding to the entry point container to the first client application associated with the user;
  - receive, over a network, a request from the first client application associated with the user to access a first folder in the content navigation structure, the first folder selected from the set of user accessible folders; and
  - mark a location in the content navigation structure for the user by adding an identifier for the first folder to a location marker that is maintained for the user at the server and updated for the user by the server based on activity by the user in the first client application, wherein the location marker tracks a current location of the user in the content navigation structure during the session with first client application;
- associate a second client application executing on a second client device with the user based on the second client application authenticating with a second credential for the user; and
- provide the identifier for the first folder from the location marker over the network to the second client application to enable the second client application to upload content to the current location of the user in the content navigation structure in the session with the first client application without navigating through the content navigation structure from the entry point container for the user to the marked location.

14. The computer program product of claim 13, wherein the instructions are executable to mark the first folder from the set of user accessible folders as the marked location based on a designation of the first folder by the first client application.

15. The computer program product of claim 13, wherein the second client application is a mobile imaging application.

16. The computer program product of claim 13, wherein the content navigation structure includes a default location for the user and the marked location is different than the default location.

17. The computer program product of claim 13, wherein the instructions are further executable to provide an updated interface to the first client application based on activity by the second client application with respect to the first folder.

18. The computer program product of claim 13, wherein the instructions are executable to provide the identifier for the first folder from the location marker to the second client application during a log in handshake process with the second client application.

19. A method for location aware content management, the method comprising:
- associating, by a server, a first client application executing on a first client device with a user from a plurality of users based on the first client application authenticating with a first credential for the user;
- during a session between the server and the first client application associated with the user from the plurality of users, the server performing:
  - providing a content navigation structure for the user, the content navigation structure representing a set of user accessible objects selected, based on the user, from a set of managed objects managed by a content management system, the set of user accessible objects comprising an entry point container for the user and a set of user accessible folders below the entry point container in a hierarchy;
  - providing a user interface corresponding to the entry point container to the first client application associated with the user;
  - receiving, over a network, a request from the first client application associated with the user to access a first folder in the content navigation structure, the first folder selected from the set of user accessible folders; and
  - marking a location in the content navigation structure for the user by adding an identifier for the first folder to a location marker that is maintained for the user at the server and updated for the user by the server based on activity by the user in the first client application, wherein the location marker tracks a current location of the user in the content navigation structure during the session with first client application;
- associating, by the server, a second client application executing on a second client device with the user based on the second client application authenticating with a second credential for the user;
- providing the identifier for the first folder from the location marker over the network to the second client application to enable the second client application to upload content to the current location of the user in the content navigation structure in the session with the first client application without navigating through the content navigation structure from the entry point container for the user to the marked location; and
- receiving content uploaded by the second client application to the first folder.

20. The method of claim 19, further comprising the first folder from the set of user accessible folders as the marked location based on a designation of the first folder by the first client application.

21. The method of claim 19, wherein the second client application is a mobile imaging application.

22. The method of claim 19, wherein the content navigation structure includes a default location for the user and the marked location is different than the default location.

23. The method of claim 19, further comprising providing an updated interface to the first client application based on activity by the second client application with respect to the first folder.

* * * * *